(12) United States Patent
Sander

(10) Patent No.: US 7,525,727 B2
(45) Date of Patent: Apr. 28, 2009

(54) MICROSCOPE WITH MICROMIRROR ARRAY SIMULTANEOUSLY PROVIDING TWO DIFFERENT DEFLECTION PATHS

(75) Inventor: Ulrich Sander, Rebstein (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 11/747,349

(22) Filed: May 11, 2007

(65) Prior Publication Data

US 2007/0285770 A1 Dec. 13, 2007

(30) Foreign Application Priority Data

May 15, 2006 (DE) ............ 10 2006 022 592

(51) Int. Cl.
*G02B 21/06* (2006.01)
(52) U.S. Cl. ..................................... 359/388
(58) Field of Classification Search .......... 359/368–398
See application file for complete search history.

(56) References Cited

U.S. PATENT DOCUMENTS

| 5,587,832 | A | * | 12/1996 | Krause ................ 359/385 |
| 6,069,733 | A | * | 5/2000 | Spink et al. ........... 359/388 |
| 6,128,077 | A | | 10/2000 | Jovin et al. |
| 6,399,935 | B1 | * | 6/2002 | Jovin et al. ........... 250/216 |
| 6,473,229 | B2 | | 10/2002 | Nakamura |
| 6,483,641 | B1 | * | 11/2002 | MacAulay ............. 359/385 |
| 6,525,878 | B1 | * | 2/2003 | Takahashi ............. 359/466 |
| 6,898,004 | B2 | * | 5/2005 | Shimizu et al. ........ 359/385 |
| 7,057,807 | B2 | | 6/2006 | Sander |
| 7,154,649 | B2 | | 12/2006 | Pfefferseder et al. |
| 2002/0036824 | A1 | * | 3/2002 | Sasaki .................. 359/385 |
| 2003/0063376 | A1 | * | 4/2003 | Shimizu et al. ........ 359/380 |
| 2004/0047030 | A1 | * | 3/2004 | MacAulay ............. 359/368 |

FOREIGN PATENT DOCUMENTS

DE 19960583 A1 7/2001

* cited by examiner

*Primary Examiner*—Alessandro Amari
*Assistant Examiner*—Mark Consilvio
(74) *Attorney, Agent, or Firm*—Hodgson Russ LLP

(57) ABSTRACT

The present invention relates to a microscope (100) having an illumination unit (4) for generating an illumination beam path (4b, 4a), the microscope (100) comprising a main objective (2) that defines an observation beam path (17a) and comprising at least one deflection element (5, 6, 7) for deflecting the observation beam path (17a), at least one of the deflection elements (5, 6, 7) being embodied as a micromirror array (5') having individually controllable and adjustable micromirrors (50), the micromirrors of the micromirror array (5') being adjustable in such a way that in addition to the observation beam path (17a, 17b), the illumination beam path (4a, 4b) also proceeds via this micromirror array (5').

9 Claims, 4 Drawing Sheets

MICROSCOPE WITH MICROMIRROR ARRAY SIMULTANEOUSLY PROVIDING TWO DIFFERENT DEFLECTION PATHS

CROSS REFERENCE TO RELATED APPLICATIONS

This application claims priority of German patent application no. 10 2006 022 592.9 filed May 15, 2006 which is incorporated by reference herein.

FIELD OF THE INVENTION

The present invention relates to a microscope having an illumination unit for generating an illumination beam path, the microscope comprising a main objective that defines an observation beam path and at least one deflection element for deflecting the observation beam path.

BACKGROUND OF THE INVENTION

Such microscopes are often embodied as stereomicroscopes, in particular as surgical microscopes. DE 103 25 575 A1 (corresponds to U.S. Pat. No. 7,057,807) discloses a microscope of this kind for simultaneous observation of a specimen by a first and a second observer, the microscope comprising deflection elements for deflecting an observation beam path, which proceeds parallel to the optical axis of the main objective, into a first plane that extends substantially perpendicular to the aforesaid optical axis, and then into a second plane that is substantially parallel to and above the first plane. Devices are also provided for coupling out the observation beam path for the observers. In this microscope, there is provided between the main objective and the first plane an illumination unit that generates an illumination beam path which is guided through the main objective of the microscope. An advantage of this shared utilization of the main objective for the illumination and observation beam paths is that upon a change in the focal length of the main objective, a separate adaptation of the illuminated field to the changing field of view is not necessary. On the other hand, the illumination unit to be accommodated between the main objective and said first plane requires space that increases the overall physical height of the microscope. The distance between the main objective and the first deflection element that deflects the observation beam path into the first plane should, however, be kept as small as possible for optical reasons, for example because of vignetting and reflections.

A stereomicroscope configuration that is similar in terms of the arrangement of the illumination unit in the microscope is known from US 2001/0010592 A1. With the configuration described therein, connection of an assistant's microscope allows specimen observation by a total of three observers. Here as well, a microscope configuration of the least possible vertical height is to be implemented. Here the illumination unit is located at the height of the main objective and next to it, below a first plane in which the observation beam path, after the first deflection thereof by a first deflection element, proceeds behind the main objective of the microscope.

SUMMARY OF THE INVENTION

It is the object of the present invention further to reduce the overall height and/or the number of components in the context of microscopes of the aforesaid kind, in order thereby also, in particular, to achieve improvements in optics.

This object is achieved by a microscope according to the present invention as described herein.

In the context of the microscope according to the present invention, at least one of the deflection elements for deflection of the observation beam path is embodied as a micromirror array having individually controllable and adjustable micromirrors, the micromirror array being adjustable in such a way that in addition to the observation beam path, the illumination beam path also proceeds via this deflection element. The deflection element thus acquires a multifunctionality in that said element both ensures deflection of the observation beam path in the desired fashion and simultaneously permits the illumination beam path to be reflected in.

Several advantageous effects are thereby achieved: On the one hand, it is possible to omit a deflection mirror that as a rule is present in the illumination unit, and that deflects the illumination beam path toward the object plane or, if the illumination beam path is guided through the main objective, firstly toward the main objective. In particular, however, the illumination unit now no longer needs to be arranged between the main objective and the first deflection element for the observation beam path; instead it is possible to arrange the illumination unit in one of the microscope planes mentioned earlier, in particular in the first plane in which the observation beam path proceeds, after being deflected for the first time by the deflection element, behind the main objective. The invention furthermore allows a flexible arrangement of one or even multiple illumination units.

Micromirror arrays as such are known from the existing art. They are generally made up of a two-dimensional arrangement of individual micromirrors whose positions are adjustable individually or in suitably combined fashion. The micromirrors are joined to a stationary support element. By appropriate adjustment of the micromirrors while the support element remains stationary, it is possible to implement a beam deflection system that consequently requires little space. The absence of a need for pivoting of the support element or deflection element further contributes to the small overall height of the microscope. The overall height is decreased in particular by the novel manner (already mentioned) of arranging the illumination unit. Because the distance between the main objective and first deflection element can thereby also be decreased, in particular when the illumination beam path is guided through the main objective, vignetting and reflections can be reduced.

In an advantageous embodiment, the micromirrors of the micromirror array are adjustable in such a way that at least two different deflection angles of the micromirrors for the illumination beam path and observation beam path can be set. The micromirror array acts in the microscopic region as a geometric beam splitter and in the macroscopic region as a physical beam splitter. Because the micromirrors can assume different angular positions relative to one another, two different deflection angles can be implemented simultaneously with a single deflection element that is embodied as a micromirror array. The displaceability of the micromirrors makes possible, in particular, a flexible selection of the deflection angles. In particular, two or more illumination beam paths, for example from respectively different illumination units, can also be directed onto the deflection element embodied as a micromirror array, and by appropriate deflection can be guided through the main objective of the microscope and from there onto the specimen, or directly onto the specimen. For example, two different illuminations, such as white light and UV light, can thus be directed at different angles, in space-saving fashion, onto the specimen.

The invention makes possible a beam path arrangement in which the observation beam path and illumination beam path can overlap as applicable. For this purpose the micromirrors are adjusted, in a homogeneous intermixture over the desired reflection region, both to the one angle for the observation beam path and to the other angle for the illumination beam path. Although a geometric beam split is accomplished here in the micro region, the array as a whole acts in the macroscopic region as a physical beam splitter, although additionally with at least two different deflections. An incoupling of the illumination directly into the observation beam path can be performed in this fashion without producing vignetting.

In a particularly advantageous embodiment, the illumination unit is arranged in a plane together with a microscope component, in particular a zoom system of the microscope, the main beam of the observation beam path that proceeds through the main objective, or the optical axis of the main objective, being substantially perpendicular to said plane. With this embodiment the illumination unit can be arranged, in particular, in one of the planes mentioned initially in connection with DE 103 25 575 A1 (first or second plane), the illumination unit then being arranged adjacent to another microscope component such as a zoom system, a magnification changer, or an intermediate imaging system or other optical components. "Adjacent" means, in this context, an arrangement in a substantially horizontal plane adjacent to said microscope component, so that this plane substantially contains the microscope component and the illumination unit, or intersects the two. With such an arrangement, a definition reduction in overall height (in the vertical direction) is achieved, and the microscope is of more compact configuration.

It is particularly advantageous in this context if the first deflection element of the microscope behind the main objective is implemented as a micromirror array. The illumination unit can then be arranged in the first plane, in which the observation beam path proceeds after its first deflection.

As a result of the use, according to the present invention, of a micromirror array as a deflection mirror additionally for the illumination beam path, the position of the illuminated field generated in the object field by the illumination beam path can be modified in controlled fashion and thus adapted to the field of view, for example centered with respect to the field of view. With a micromirror array it is furthermore possible to generate any desired illuminated-field geometry, i.e. any desired illuminated-field pattern, by appropriate application of control to the mirror array; the illuminated-field geometries that are generated can moreover be caused to vary over time. For example, a slit-shaped illuminated field can be projected instead of a round illuminated field. Furthermore, the diameter of round or annular illuminated fields can be modified. Strip or grid patterns can also be generated in order to present the topography of a specimen on the object field. Patterns shaped like phases of the moon can also, for example, be created in order to prevent reflections. The use of a micromirror array thus offers numerous possibilities for adapting the illumination to a desired field of view in the context of a microscopic examination. The hitherto usual adjustment of the illuminated field via a field diaphragm moreover resulted in a light loss that does not occur when a micromirror array is used, since the latter can utilize all the light that is available, i.e. can reflect it to generate a desired illuminated-field geometry.

The generation of illuminated-field geometries that vary over time, e.g. the generation of a pulsed illuminated-field pattern, including along the lines of a stroboscopic illumination, may be advisable in order to reduce the light quantity in the illuminated field for the purpose of protecting the specimen being examined (cells, tissue, eye).

A further possibility in the context of the use of a micromirror array as a deflection mirror for the illumination beam path involves spatial variation of the light intensity of the illuminated field. It is thereby possible to produce, for example, a center-weighted, e.g. bell-shaped distribution of the illuminated-field intensity in the object plane, in simple fashion and independently of the emission characteristics of the light source. Specimen regions of interest can thereby be more strongly illuminated, while peripheral regions are exposed to less illumination (and thus less stress).

In an advantageous embodiment of the invention, the micromirrors of the micromirror array are adjustable in such a way that in addition to the deflection components for the illumination beam path and for the observation beam path, optically correcting components of the micromirror orientation are additionally present. In the corresponding regions of the micromirror array that are provided for observation and/or for illumination, in addition to the deflection component an optically correcting constituent can be overlaid in a context of adaptive optics. It is particularly useful to control this additional optically correcting constituent as a function of the magnification setting of a microscope zoom, and as a function of the focal length of the main objective. Aberrations that depend on the zoom setting or the focal length of the main objective can thus be corrected by an optically correcting constituent in the micromirror array.

A significant advantage is thereby obtained for microscopes in which the illumination is guided through the main objective. In a context of adaptive optics, for example, edge blurring of the illuminated field occurring as a function of the focal length of the main objective can be corrected with a micromirror array with no need to shift a lens in the illuminating optical system. For this purpose, the micromirrors in the region for illumination can be displaced in such a way that the micromirror array additional exhibits a spherical component. The optical system can thereby be greatly simplified, since complex, highly corrected imaging systems are not necessary.

When a microscope having a main objective of variable focal length is used, such as the one usually present in surgical microscopes for neurosurgery, it is advantageous in the context of the present invention if the micromirrors of the micromirror array in the region for illumination are controllable in such a way that the illuminated field generated on the specimen by the illumination beam path is modifiable as a function of the main objective focal length that is set. The modifiability of the illuminated field refers here in particular to the shape, size, location, and/or light intensity of the illuminated field. Depending on the focal length that is set for the main objective, the necessary readjustment of the location and size of the illuminated field for adaptation to the field of view (longer focal lengths or working distances result, without correction, in larger illuminated-field diameters of lower brightness) can thus be accomplished in particular in microscopes in which the illumination is directed onto the specimen separately, alongside the main objective, via a mirror.

A further advantage results for microscopes, in particular stereomicroscopes and/or surgical microscopes, that are equipped with a zoom system for variable magnification of the specimen image. Here as well, it is useful if the micromirrors of the micromirror array are controllable in such a way that the illuminated field generated in the object field by the illumination beam path is modifiable as a function of the zoom magnification that is set. As a result of the modification of the illuminated-field diameter as a function of the zoom system, the illuminated field can always be adapted to the field of view during the zoom operation. The reason is that as the zoom magnification increases, the field of view becomes smaller, i.e. the illuminated-field diameter must also be made smaller. This causes an increase in brightness in the object field when a micromirror array is used. Because, however, the increasing zoom magnification simultaneously leads to a reduction in brightness (in the eyepiece), the two effects can compensate for one another. Consistency in brightness for the observer and/or for documentation (by means of a downstream camera) can thus thereby be achieved. This allows the observer to work without fatigue, and permits good comparability between documented procedures.

BRIEF DESCRIPTION OF THE DRAWINGS

The invention and its advantages will be further explained with reference to the exemplifying embodiments that follow, utilizing the appended Figures in which.

DETAILED DESCRIPTION OF THE INVENTION

Figure 1:
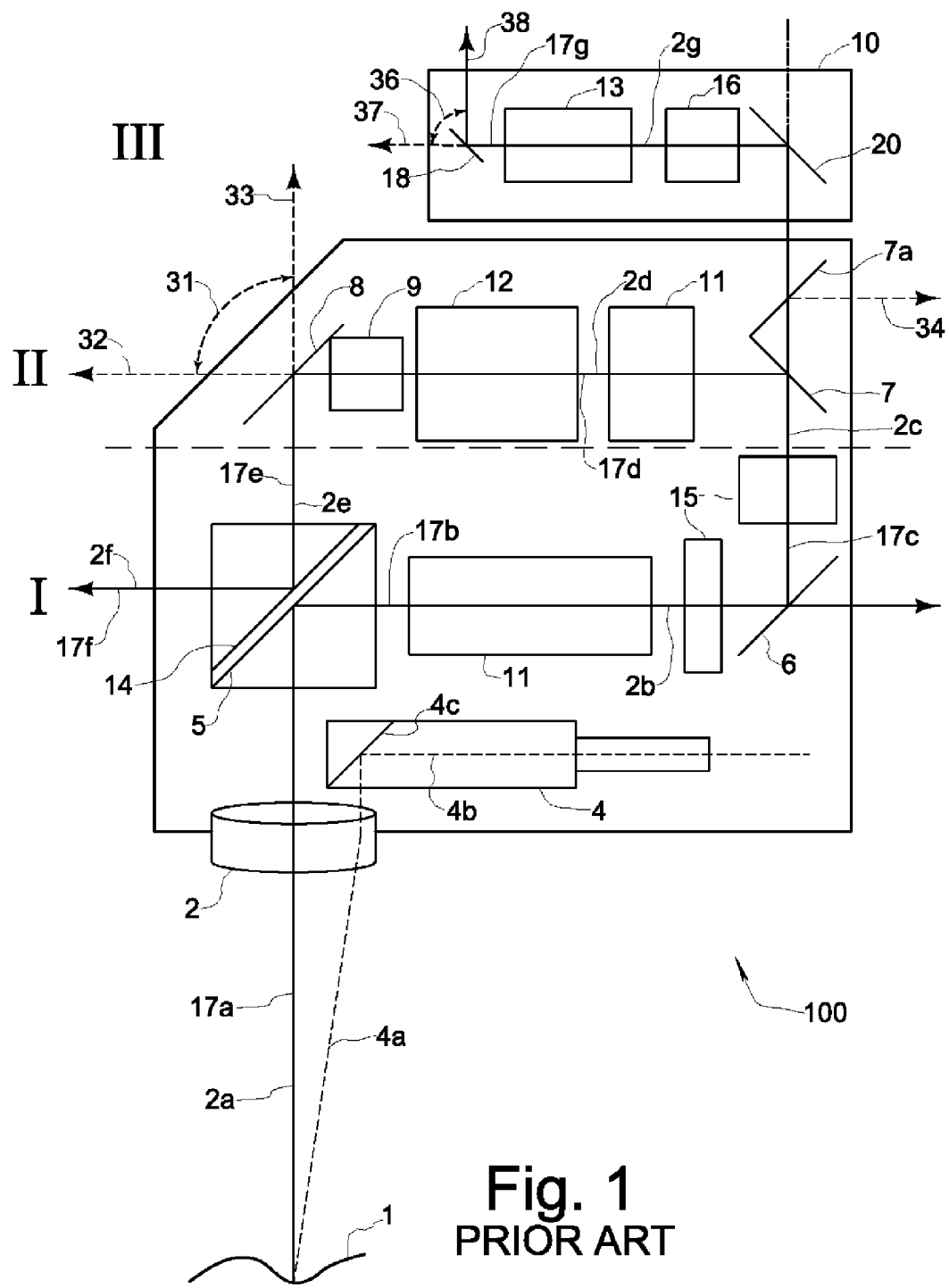
FIG. 1 schematically depicts a microscope configuration known from the existing art.

FIG. 1 shows an embodiment of a stereomicroscope according to DE 103 25 575 A1, which embodiment will be briefly explained below. A neurological specimen 1 is, for example, to be observed by means of microscope 100. An illumination device, which illuminates specimen 1 along an illumination axis (main beam of the illumination beam path) 4a, is labeled 4 in its entirety.

As a rule, an illumination unit for a microscope generally contains one or more of the following components: a light source, such as an incandescent or halogen lamp, a mercury-vapor, xenon, or LED lamp, in which context light can also be coupled into the illumination unit via an optical waveguide (light-guiding fiber) and the light sources can be coherent or incoherent radiation sources; a field diaphragm (iris diaphragm) for establishing a desired illuminated-field diameter on the object field; and a lens group for imaging the field diaphragm into the desired object plane. This imaging is performed by the main objective of the microscope when the illumination is guided through said main objective. An illumination zoom can also be provided in the illumination unit. The brightness of an illumination unit can be influenced optomechanically, for example, by means of an iris diaphragm arranged in the illumination aperture or by means of an illumination zoom, the illumination zoom influencing both the diameter of the illuminated field and the illumination aperture.

Specimen 1 is imaged via a main objective 2 into microscope 100. The optical axis of main objective 2, or the main beam of the observation beam path defined by main objective 2, is labeled 2a. In the exemplifying embodiment depicted, it extends substantially vertically; be it noted that microscope 100 and therefore also optical axis 2a can be oriented in all spatial directions. Passing through the main objective is an observation beam path 17a that proceeds along optical axis 2a. Observation beam path 17a is then deflected via a deflection element 5 into a first microscope plane I. The optical axis in this first microscope plane I is labeled 2b, and the deflected beam path is labeled 17b. Optical components 11, 15 are arranged in first microscope plane I; these can be intermediate imaging systems and/or magnification systems. Observation beam path 17b proceeding in first microscope plane I is subsequently deflected via a deflection element 6 along an axis 2c into the vertical, and then via a further deflection element 7 into a second second microscope plane II extending substantially horizontally and parallel to first microscope plane I. Optical components 15, 11, 12 can in turn be introduced into observation beam paths 17c and 17d; these optical components 15, 11, 12 can be, for example, data overlay systems, shutters, filters, transparent displays, beam deflection systems, or image erectors, as well as the intermediate imaging and/or magnification systems already mentioned. The nature and arrangement of these optical components is not critical for the present invention and will therefore not be discussed further.

With no limitation as to generality and for illustration of the present invention, optical element 11 depicted in FIG. 1 in microscope plane I is intended to be a zoom system that permits stepless magnification. (In practice, an assistant's microscope 10 would not be present in this case.)

In this exemplifying embodiment an optical splitter 9 is provided in optical axis 2d, and thus in observation beam path 17d, in order to couple out the observation beam path for documentation purposes.

Deflection elements 8 and 14 allow the definition of observation beam paths 17e and 17f that enable a viewing direction for the first observer (principal surgeon) along an optical axis 2f. The binocular tubes for the principal observer that adjoin deflection element 14 are not shown in order to simplify the depiction. Alternatively, deflection element 8 can also be dispensed with, correspondingly allowing observation by the principal surgeon in second plane II. It should likewise be noted in addition that a variable viewing angle is achievable by suitable embodiment of deflection element 8, the angular range over which this view is pivotable being illustrated by means of arrow 31 that extends over the corresponding viewing directions 32 and 33.

For the sake of completeness, the arrangement of the assistant's module will also be explained. Beam path outcoupling for a second observer (assistant) is achieved with the aid of deflection element 7, which is embodied in semitransparent fashion. A portion of the observation beam path that strikes deflection element 7 is thus not deflected, but instead proceeds further along optical axis 2c and strikes a further deflection element 20 that is provided in an assistant's microscope labeled 10 in its entirety. This deflection element 20 causes the deflection of observation beam path 17c into a third microscope plane III in which observation beam path 17g proceeds. Additional optical components (labeled 16 in their entirety) for the assistant, and a second magnification system 13 for the assistant, are provided in microscope plane III. Optical element 16 can be, for example, an image erector. Optical elements 11 or 15 can moreover be introduced here as well. The optical axis of magnification system 13 is labeled 2g. As with to the principal observer direction, the assistant's view can also be configured variably by means of a rotatable deflection element 18. The angular range over which the assistant's view is rotatable is once again depicted by means of an arrow 36 that extends between the corresponding viewing directions 37 and 38.

More detailed explanations of the microscope configuration depicted in FIG. 1 may be taken from DE 103 25 575 A1, to which reference is explicitly made here.

In the context of the microscope configuration depicted in FIG. 1, illumination unit 4 is provided between main objective 2 and first plane I; this unit generates an illumination beam path 4b that is guided by means of a deflection element 4c to and through main objective 2 of microscope 100. The space thereby required by illumination unit 4 causes an overall increase in the physical height of the microscope and is also disadvantageous for optical reasons, because of vignetting and reflections.

According to the present invention, in the embodiment of a microscope 100 that is depicted, deflection element 5 is embodied as micromirror array 5' having individually controllable and adjustable micromirrors 50, micromirror array 5' being adjustable in such a way that in addition to observation beam path 17a, 17b, illumination beam path 4b, 4a also proceeds via this deflection element 5'. Be it noted in this connection that depending on the desired arrangement of illumination unit 4 inside microscope 100, other deflection units such as, for example, deflection elements 6 or 7 can also, alternatively or additionally, be embodied as micromirror arrays. For the sake of simplicity, in the present exemplifying embodiment only deflection element 5' is intended to be embodied as a micromirror array.

Figure 2:
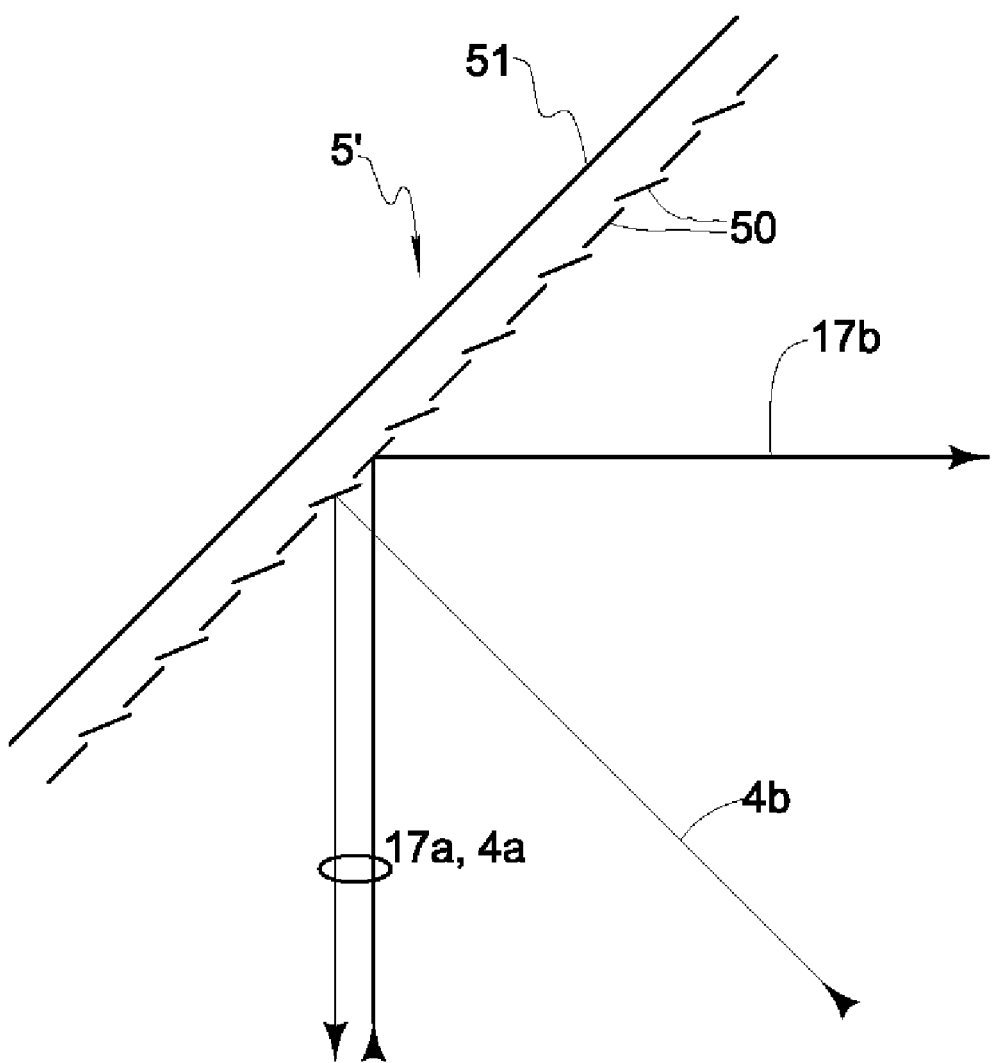
FIG. 2 is a schematic depiction, in lateral section, of a deflection element according to the invention with the associated illumination and observation beam paths.

FIG. 2 schematically shows deflection element 5' that is embodied as a micromirror array, and a support element 51 and micromirrors 50 attached and mounted thereon. A lateral section through deflection element 5', the latter corresponding to deflection element 5 of FIG. 1, is depicted. Additionally depicted are observation beam path 17a that comes from main objective 2 of microscope 100 (cf. FIG. 1), and observation beam path 17b after deflection at deflection element 5. Also depicted is illumination beam path 4b that is generated by illumination unit 4 (cf. FIG. 1), as well as illumination beam path 4a after deflection at deflection element 5'.

Micromirrors 50 are adjustable as to their orientation, individually or in suitable combination. The orientation depicted in FIG. 2 of micromirrors 50 with respect to one another yields the beam paths depicted, and thus two different deflection angles simultaneously. It is evident to one skilled in the art that three or more deflection angles can in principle also be implemented by appropriate orientation of micromirrors 50. It may also be noted that beam path 4b depicted in FIG. 2 for the illumination beam path can lie in, but also outside, the drawing plane. The corresponding micromirrors 50 are to be oriented suitably for this purpose, for example in such a way that an illumination beam path 4b arriving onto the drawing plane proceeds after deflection, as illumination beam path 4a, in the drawing plane (toward main objective 2). The embodiment according to the present invention of deflection element 5' as a micromirror array thus permits a very flexible arrangement of an illumination unit 4 in a microscope 100 depicted in FIG. 1.

Figure 3:
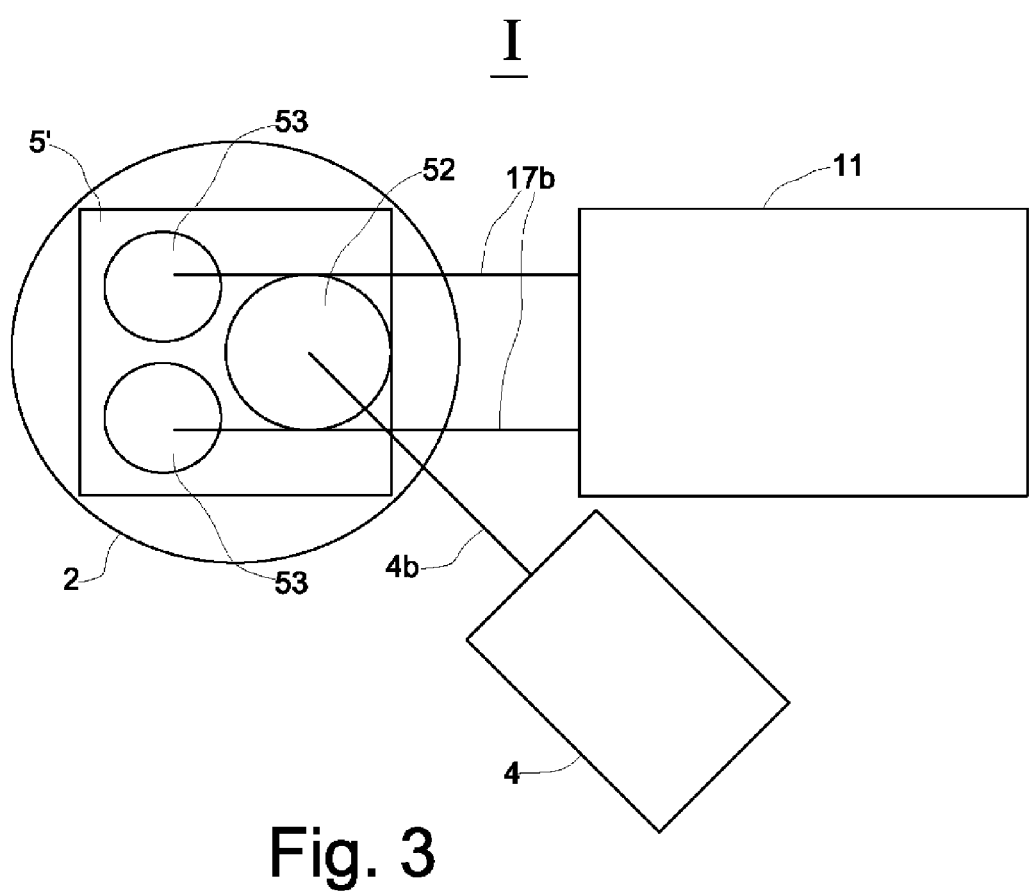
FIG. 3 shows the arrangement of a microscope component and of the illumination unit of the microscope in a common plane, with a typical area distribution and therefore angle distribution of micromirrors in the micromirror array.

FIG. 3 is a plan view of plane I of FIG. 1. What is depicted is, for example, a zoom system 11 (or another optical component) and an illumination unit 4 arranged adjacent to said zoom system 11, so that illumination unit 4 and zoom system 11 lie substantially in one common (horizontal) plane I. The illumination beam path directed toward deflection element 5' is once again labeled 4b, and the observation beam paths deflected by deflection element 5' are once again labeled 17b. Zoom system 11 causes a division into two stereoscopic channels. Beam paths 17b are depicted in FIG. 1 from the side, so that they end up behind one another. The schematically depicted main objective 2 is located below deflection element 5. As already discussed in connection with FIG. 2, by suitable orientation of some of micromirrors 50, a deflection of illumination beam path 4b can be accomplished such that the deflected illumination beam path 4a proceeds parallel to observation beam path 17a and through main objective 2, and from there onto specimen 1. As is apparent from a consideration of FIGS. 2 and 3 together, illumination beam path 17a and observation beam path 4a overlap.

The arrangement depicted in FIG. 3 allows the distance between main objective 2 and deflection element 5 or 5', in a microscope configuration depicted in FIG. 1, to be made correspondingly smaller, since because of the present invention it is now possible to arrange illumination unit 4 adjacent to microscope component 11 (or 15) in microscope plane I.

It should be noted for the sake of completeness that with a suitable arrangement or shape of main objective 2 and/or with a suitable orientation of micromirrors 50 in array 5', illumination beam path 4a can also be directed past main objective 2. Such a configuration has already been repeatedly addressed.

FIG. 3 furthermore depicts an area distribution and therefore angle distribution that is typical in terms of shape, as a cross section of the observation bundle on micromirror array 5' (=regions 53) and as a cross section of the illumination bundle on micromirror array 5' (=region 52). In this region 52, the micromirrors act as one combined mirror at the angle specific for the direction of incidence of the illumination. Micromirrors 50 in regions 53, which are used for stereoscopic observation, deflect beam axes 17a into axes 17b at a different (preferably right) angle. With the arrangement depicted in FIG. 3, the location of the illumination bundle directed onto specimen 1 (location and angle distribution in region 52) relative to the observation bundles (location and angular distribution in regions 53) coming from the specimen can easily be configured variably. Micromirror array 5' consequently acts in this case as a geometric beam splitter in the macroscopic region as well.

Figure 4:
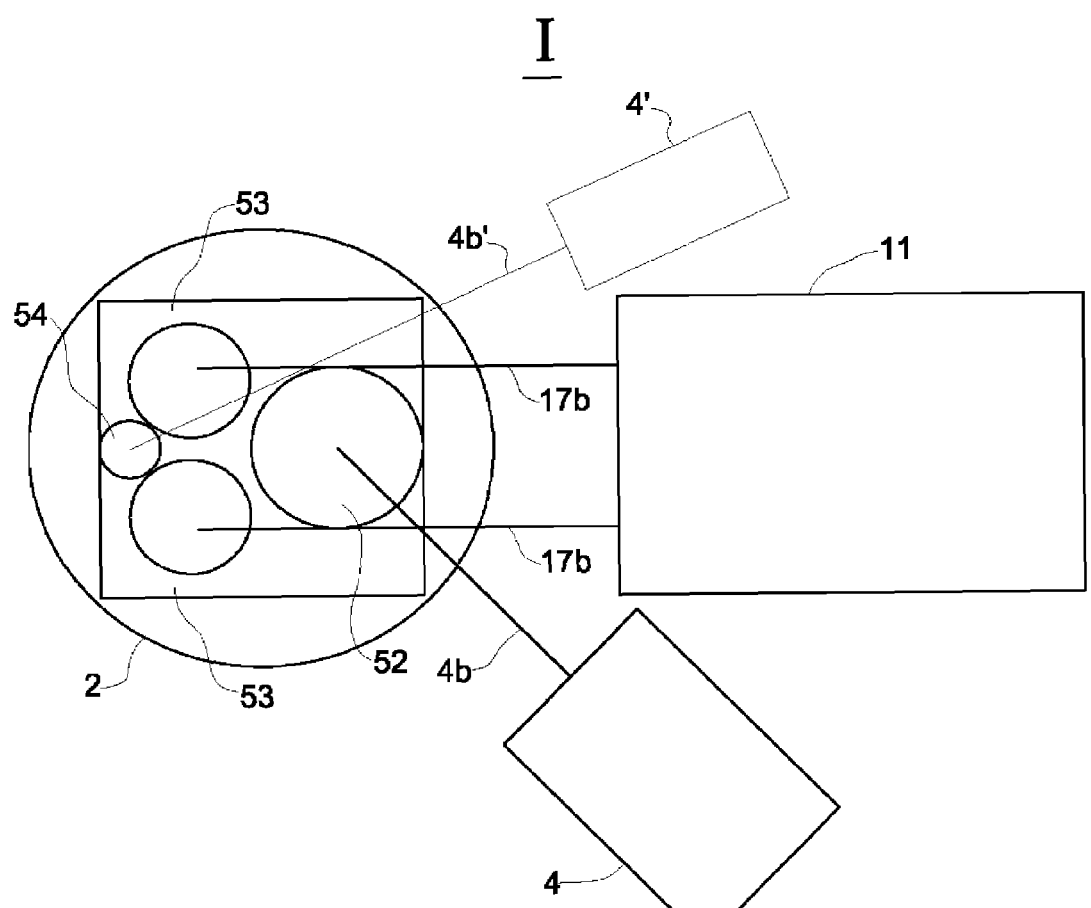
FIG. 4 shows a typical area distribution and therefore angle distribution of micromirrors in the micromirror array, in the context of two illumination units.

FIG. 4 is a depiction analogous to FIG. 3, having a further illumination unit 4' and associated illumination beam path 4b'. Region 54 represents the cross section of the illumination bundle of illumination unit 4' on micromirror array 5'. As already mentioned, micromirror array 5' can in this fashion be used to implement two different illuminations, for example white light and UV light. It is thus possible, in space-saving fashion, to place in plane I multiple illumination units whose illumination beam paths are incident at different angles onto deflection element 5'. It may be further remarked in this connection that illumination unit 4 and/or a further illumination unit 4' can also, for example, be arranged parallel to observation beam path 17c or 17d (cf. FIG. 1) if the corresponding deflection elements 6 and 7 are embodied as micromirror arrays.

The location and orientation of micromirrors 50 in deflection element 5' can be programmed without restriction. Any desired shapes and overlaps of the illumination and observation beams are thus possible, and can be adapted, including in time-variable fashion, to the respective optical system conditions. Such an adaptation is possible in particular as a function of the particular setting of zoom system 11.

PARTS LIST

1 Specimen
2 Main objective
2a Optical axis of main objective
2b-2g Optical axes
4, 4' Illumination device 4a Illumination axis, illumination beam path
4b, 4b' Illumination beam path
4c Deflection element
4d Deflection element
5 Deflection element
5' Micromirror array, deflection element
6 Deflection element
7 Deflection element
8 Deflection element
9 Optical splitter
10 Assistant's microscope
11 Optical component, zoom system
12 Optical component
13 Magnification system
14 Deflection element
15 Optical component
16 Optical constituent
17a-17g Observation beam paths
18 Deflection element
20 Deflection element
31 Angular range arrow
32, 33 View directions
36 Angular range arrow
37, 38 Viewing directions
50 Micromirrors
51 Support element
52 Micromirror region for illumination
53 Micromirror region for observation
54 Micromirror region for illumination
100 Microscope
I First microscope plane
II Second microscope plane
III Third microscope plane

What is claimed is:

1. A microscope comprising:
a main objective;
an observation beam path passing through the main objective;
an illumination unit for generating an illumination beam path leading to an observed specimen;
an optical component in the observation beam path, wherein the illumination unit is arranged in a plane with the optical component, and an optical axis of the main objective is substantially perpendicular to the plane; and
a micromirror array having individually controllable and adjustable micromirrors;
wherein the observation beam path and the illumination beam path are deflected by the micromirror array and the individual mirrors of the micromirror array are controlled and adjusted to simultaneously provide a first plurality of micromirrors set to a first orientation for deflecting the observation beam path and a second plurality of micromirrors set to a second orientation different from the first orientation for deflecting the illumination beam path.

2. The microscope according to claim 1, wherein the micromirrors of the micromirror array are adjustable to set two different deflection angles of the micromirrors for the illumination beam path and the observation beam path, respectively.

3. The microscope according to claim 1, wherein the illumination beam path and observation beam path at least partially overlap one another.

4. The microscope according to claim 1, wherein the optical component is a zoom system.

5. The microscope according to claim 1, wherein the observation beam path, after passing through the main objective, is first deflected by the micromirror array.

6. The microscope according to claim 1, wherein the micromirrors of the micromirror array are adjustable to correct edge blurring and aberrations of an illuminated field generated on a specimen by the illumination beam path.

7. A microscope comprising:
a main objective;
an observation beam path passing through the main objective;
an illumination unit for generating an illumination beam path leading to an observed specimen; and
a micromirror array having individually controllable and adjustable micromirrors;
wherein the observation beam path and the illumination beam path are deflected by the micromirror array, the micromirrors of the micromirror array are adjustable to correct edge blurring and aberrations of an illuminated field generated on a specimen by the illumination beam path, and the main objective is of variable focal length for variable magnification of a specimen image, and the micromirrors of the micromirror array are adjustable to modify the illuminated field as a function of a focal length setting of the main objective.

8. A microscope comprising:
a main objective;
an observation beam path passing through the main objective;
an illumination unit for generating an illumination beam path leading to an observed specimen;
a micromirror array having individually controllable and adjustable micromirrors; and
a zoom system for variable magnification of a specimen image, wherein the micromirrors of the micromirror array are adjustable to modify the illuminated field as a function of a magnification setting of the zoom system;
wherein the observation beam path and the illumination beam path are deflected by the micromirror array, the micromirrors of the micromirror array are adjustable to correct edge blurring and aberrations of an illuminated field generated on a specimen by the illumination beam path.

9. The microscope according to claim 1, further comprising an additional illumination unit for generating an additional illumination beam path, wherein the additional illumination beam path is deflected by the micromirror array.

* * * * *